(12) United States Patent
Aman et al.

(10) Patent No.: US 7,580,242 B2
(45) Date of Patent: Aug. 25, 2009

(54) DIELECTRIC CERAMIC COMPOSITION AND ELECTRONIC DEVICE

(75) Inventors: Sanshiro Aman, Narita (JP); Takashi Kojima, Narita (JP); Mari Miyauchi, Narita (JP); Masakazu Hosono, Narita (JP); Dan Sakurai, Yurihonjo (JP); Kosuke Takano, Narita (JP); Nobuto Morigasaki, Narita (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 12/071,470

(22) Filed: Feb. 21, 2008

(65) Prior Publication Data

US 2008/0297979 A1 Dec. 4, 2008

(30) Foreign Application Priority Data

Apr. 12, 2007 (JP) ............................. 2007-105189
Sep. 28, 2007 (JP) ............................. 2007-255591

(51) Int. Cl.
*H01G 4/06* (2006.01)
(52) U.S. Cl. .............. 361/321.5; 361/321.1; 361/321.4; 361/311; 361/312; 361/313
(58) Field of Classification Search .............. 361/321.4, 361/321.5, 321.1, 321.2, 311–313, 303–305; 501/134, 136–139
See application file for complete search history.

(56) References Cited

U.S. PATENT DOCUMENTS

| | | | | |
|---|---|---|---|---|
| 6,072,688 A * | 6/2000 | Hennings et al. | ............. | 361/311 |
| 6,243,254 B1 * | 6/2001 | Wada et al. | ................. | 361/311 |
| 6,310,761 B1 * | 10/2001 | Hori et al. | ................. | 361/321.2 |
| 6,733,897 B2 * | 5/2004 | Choi et al. | ................... | 428/472 |
| 6,790,801 B2 * | 9/2004 | Kim et al. | .................... | 501/136 |
| 6,967,180 B2 * | 11/2005 | Banno | ........................ | 501/136 |

FOREIGN PATENT DOCUMENTS

| | | |
|---|---|---|
| EP | 0 605 904 A2 | 7/1994 |
| EP | 0 977 217 A1 | 2/2000 |
| JP | B2 3567759 | 9/2004 |

* cited by examiner

*Primary Examiner*—Nguyen T Ha
(74) *Attorney, Agent, or Firm*—Oliff & Berridge, PLC

(57) ABSTRACT

The invention aims at providing a dielectric ceramic composition including $Ba_mTiO_{2+m}$ where "m" satisfies $0.99 \leq m \leq 1.01$ and $Ba_nZrO_{2+n}$ where "n" satisfies $0.99 \leq n \leq 1.01$, an oxide of Mg, an oxide of R where R is at least one selected from Sc, Y, La, Ce, Pr, Nd, Pm, Sm, Eu, Gd, Tb, Dy, Ho, Er, Tm, Yb and Lu, an oxide of at least one element selected from Mn, Cr, Co and Fe, and an oxide of at least one element selected from Si, Li, Al, Ge and B. 35 to 65 moles of $Ba_nZrO_{2+n}$, 4 to 12 moles of an oxide of Mg, 4 to 15 moles of an oxide of R, 0.5 to 3 moles of an oxide of Mn, Cr, Co and Fe, and 3 to 9 moles of an oxide of Si, Li, Al, Ge and B are included therein per 100 moles of the $Ba_mTiO_{2+m}$.

6 Claims, 1 Drawing Sheet

DIELECTRIC CERAMIC COMPOSITION AND ELECTRONIC DEVICE

BACKGROUND OF THE INVENTION

1. Field of the Invention

The present invention relates to a dielectric ceramic composition having resistance to reduction and an electronic device comprising the dielectric ceramic composition in a dielectric layer, and further specifically, relates to a dielectric ceramic composition with high rated voltage (e.g. 100V or more), preferable to use in mid-high voltage applications, and electronic device.

2. Description of the Related Art

A multilayer ceramic capacitor, an example of electronic devices, for example, is manufactured by firing a green chip obtained by stacking alternately ceramic green sheets comprising pre-determined dielectric ceramic composition and internal electrode layers in a pre-determined pattern to be integrated. Since the internal electrode layer of multilayer ceramic capacitor is integrated with the ceramic dielectric body by firing, a material not reacted with the ceramic dielectric body needs to be selected. Therefore, as a material constituting the internal electrode layer, there has been no choice but using expensive noble metal such as platinum and palladium.

However, dielectric ceramic composition wherein inexpensive base metal such as nickel and copper can be used has been recently developed to attain significant cost reduction.

Also, with more densified electronic circuit, it is highly demanded to downsize an electronic device, and more downsized multilayer ceramic capacitors with higher capacitance are rapidly developed. A dielectric layer in a multilayer ceramic capacitor are becoming thinner, and a dielectric ceramic composition is required to maintain the reliability of a capacitor even when making it thinner. Especially when downsizing and increasing capacitance of a mid-high-voltage capacitor used at high rated voltage (e.g. 100V or more), a highly-reliable dielectric ceramic composition is required to constitute a dielectric layer.

To address it, for example, the Japanese Patent Publication 3567759 discloses a dielectric ceramic composition for a capacitor used under high frequency wave and high voltage, comprising a compound as a main component expressed by a composition formula, $ABO_3+aR+bM$ (note that $ABO_3$ is barium titanate based solid solution; R is an oxide of metal element such as La; and M is an oxide of metal element such as Mn), and a sintering auxiliary agent including at least one element from B element and Si element as subcomponent.

The Japanese Patent Publication 3567759 also describes that $XZrO_3$ (note that X is at least a metal element selected from Ba, Sr and Ca) as an additive component of the main component is added in a concentration of 0.35 mole or less with respect to 1 mole of barium titanate based solid solution expressed by $ABO_3$ of the main component.

However, a dielectric ceramic composition according to the Japanese Patent Publication 3567759 is low in withstand pressure (breakdown voltage) and insufficient in lifetime characteristics (accelerated lifetime of insulation resistance), resulting in a problem of lowering reliability. Especially, the problem is more significant when downsizing and increasing capacitance of a multilayer ceramic capacitor. Therefore, to attain downsizing and increase in capacitance, it has been desired to improve withstand pressure and lifetime characteristics (accelerated lifetime of insulation resistance).

SUMMARY OF THE INVENTION

A purpose of the present invention, reflecting this situation, is to provide a dielectric ceramic composition, able to be fired in a reducing atmosphere, less in electrostriction when applying a voltage and able to improve withstand pressure (breakdown voltage) and accelerated lifetime of insulation resistance as well as maintaining good specific permittivity and capacitance-temperature characteristics, and an electronic device comprising the dielectric ceramic composition as a dielectric layer.

To attain the above purpose, a dielectric ceramic composition according to a first aspect of the present invention comprises $Ba_mTiO_{2+m}$ wherein "m" satisfies $0.99 \leq m \leq 1.01$,
$Ba_nZrO_{2+n}$ wherein "n" satisfies $0.99 \leq n \leq 1.01$,
an oxide of Mg,
an oxide of R wherein R is at least one selected from Sc, Y, La, Ce, Pr, Nd, Pm, Sm, Eu, Gd, Tb, Dy, Ho, Er, Tm, Yb and Lu,
an oxide of at least one element selected from Mn, Cr, Co and Fe, and
an oxide of at least one element selected from Si, Li, Al, Ge and B;

wherein
a ratio, calculated as a conversion of an oxide or composite oxide, of each component with respect to 100 moles of said $Ba_mTiO_{2+m}$ is
$Ba_nZrO_{2+n}$: 35 to 65 moles,
an oxide of Mg: 4 to 12 moles,
an oxide of R: 4 to 15 moles,
an oxide of Mn, Cr, Co and Fe: 0.5 to 3 moles, and
an oxide of Si, Li, Al, Ge and B: 3 to 9 moles.

In the present invention, a ratio of said $Ba_nZrO_{2+n}$ with respect to 100 moles of said $Ba_mTiO_{2+m}$ is preferably 40 to 55 moles.

A dielectric ceramic composition according to a second aspect of the present invention comprises a first component expressed by a formula $(Ba_aR_b)_\alpha(Ti_cZr_dMg_e)O_3$, wherein R in the above formula is rare-earth element;
in the above formula,
$0.8 \leq a \leq 0.96$,
$0.04 \leq b \leq 0.2$,
$0.55 \leq c \leq 0.7$,
$0.24 \leq d \leq 0.39$,
$0.02 \leq e \leq 0.09$, and
$1 \leq \alpha \leq 1.15$; and
with respect to 100 moles of $Ba_mTiO_{2+m}$ wherein "m" satisfies $0.99 \leq m \leq 1.01$ included in said first component,
0.5 to 3.0 moles of an oxide of at least one element selected from Mn, Cr, Co and Fe, and 3 to 9 moles of an oxide of at least one element selected from Si, Li, Al, Ge and B are further included.

According to the present invention, there is provided an electronic device comprising a dielectric layer and an internal electrode layer, wherein said dielectric layer is comprised of a dielectric ceramic composition according to the above first or second aspect.

An electronic device according to the present invention is not particularly limited, and there may be mentioned a multilayer ceramic capacitor, piezo element, chip inductor, chip varistor, chip thermistor, chip resistor and other surface mount chip-type electronic devices (SMD).

Because a dielectric ceramic composition of the present invention comprises the above-described specified composition, it is able to be fired in a reducing atmosphere, less in electrostriction when applying a voltage and able to improve withstand pressure and accelerated lifetime of insulation resistance as well as maintaining good specific permittivity and capacitance-temperature characteristics. Especially, in the present invention, a ratio of $Ba_nZrO_{2+n}$ is relatively high, i.e. 35 to 65 moles and preferably 40 to 55 moles with respect to 100 moles of $Ba_mTiO_{2+m}$, which allows to provide a dielectric ceramic composition with improved capacitance-temperature characteristics and withstand pressure.

Therefore, by adopting the dielectric ceramic composition of the present invention in a dielectric layer of an electronic device such as a multilayer ceramic capacitor, for example, when making the dielectric layer as thin as 20 μm and using the electronic device in mid-high voltage applications with high rated voltage (e.g. 100V or more, especially 250V or more), it is possible to attain high reliability. Namely, there is provided a highly-reliable electronic device for mid-high voltage applications, able to be downsized and increase capacitance.

The electronic device of the present invention can be preferably used, for example, in a variety of automobile-related applications (fuel injector, HID lamp, etc.) and digital still camera applications.

BRIEF DESCRIPTION OF THE DRAWINGS

Hereinafter, the present invention will be described based on embodiments shown in drawings.

DESCRIPTION OF THE PREFERRED EMBODIMENTS

First Embodiment

Multilayer Ceramic Capacitor 1

Figure 1:
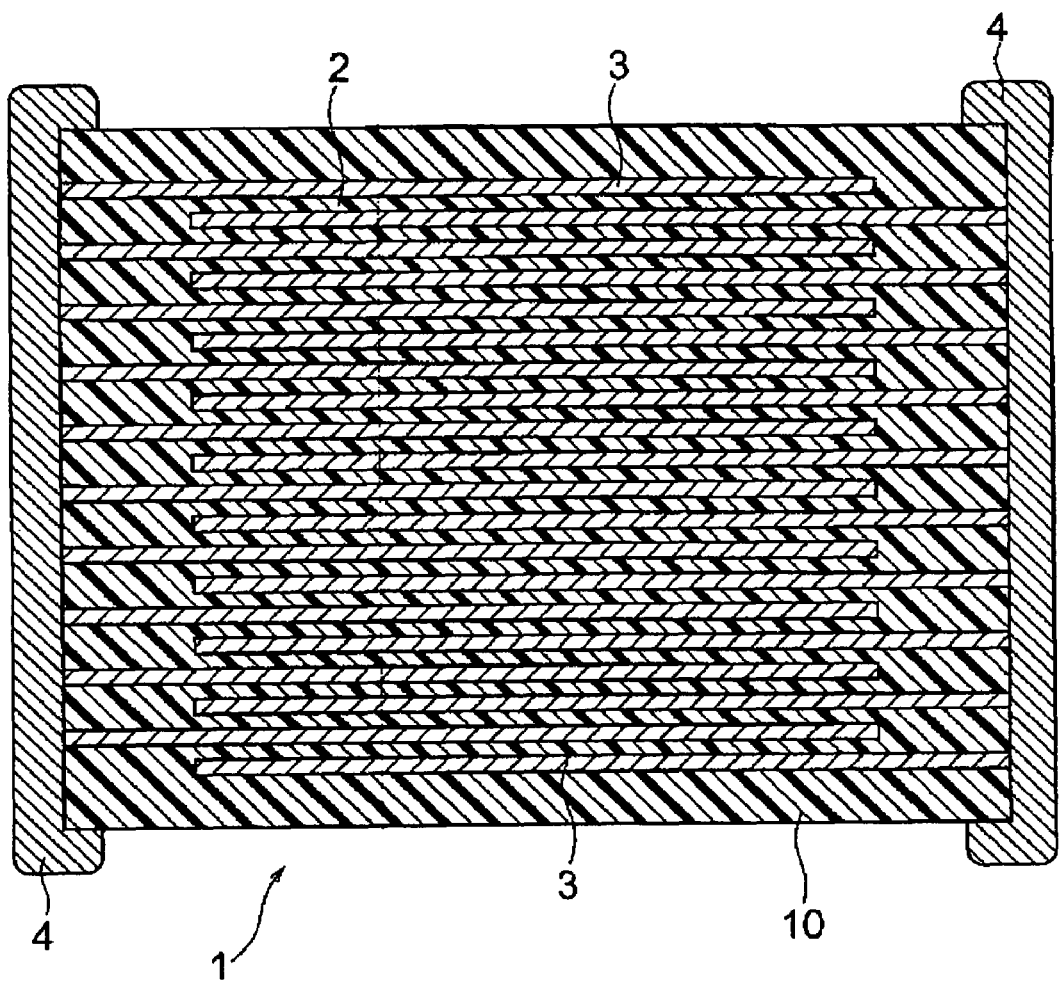
FIG. 1 is a cross-sectional view of a multilayer ceramic capacitor according to an embodiment of the present invention.

As shown in FIG. 1, a multilayer ceramic capacitor 1 according to an embodiment of the present invention comprises a capacitor device body 10 wherein a dielectric layer 2 and an internal electrode layer 3 are alternately stacked. At the both end portions of the capacitor device body 10, a pair of external electrodes 4, connected with internal electrode layers 3 alternately stacked inside the device body 10, is formed. The shape of the capacitor device body 10 is not particularly limited, and is normally rectangular parallelepiped. Also, its dimension is not particularly limited, and may be properly changed as usage.

The internal electrode layers 3 are stacked so that each end face is alternately exposed to a surface of the two opposed end portions of the capacitor device body 10. The pair of external electrodes 4 is formed at both end portions of the capacitor device body 10, and connected with the exposed end faces of the alternately-stacked internal electrode layers 3 to form a capacitor circuit.

Dielectric Layer 2

The dielectric layer 2 includes the dielectric ceramic composition of the present invention.

The dielectric ceramic composition of the present invention comprises:
  $Ba_mTiO_{2+m}$ (note that "m" satisfies $0.99 \leq m \leq 1.01$),
  $Ba_nZrO_{2+n}$ (note that "n" satisfies $0.99 \leq n \leq 1.01$),
  an oxide of Mg,
  an oxide of R (note that R is at least one selected from Sc, Y, La, Ce, Pr, Nd, Pm, Sm, Eu, Gd, Tb, Dy, Ho, Er, Tm, Yb and Lu),
  an oxide of at least one element selected from Mn, Cr, Co and Fe, and
  an oxide of at least one element selected from Si, Li, Al, Ge and B.

In $Ba_mTiO_{2+m}$, "m" satisfies $0.99 \leq m \leq 1.01$. In this case, oxygen (O) amount may slightly deviate from stoichiometric composition in the above formula. $Ba_mTiO_{2+m}$ is included mainly as base material in the dielectric ceramic composition.

A content of $Ba_nZrO_{2+n}$ is 35 to 65 moles, preferably 40 to 55 moles and further preferably 40 to 50 moles with respect to 100 moles of $Ba_mTiO_{2+m}$. Also, in $Ba_nZrO_{2+n}$, "n" satisfies $0.99 \leq n \leq 1.01$. In this case, oxygen (O) amount may slightly deviate from stoichiometric composition in the above formula. By adding $Ba_nZrO_{2+n}$ in the above range, it is possible to improve capacitance-temperature characteristics and withstand pressure. Too small amount of $Ba_nZrO_{2+n}$ tends to cause deterioration in lifetime characteristics in addition to reduction of capacitance-temperature characteristic and withstand pressure. On the other hand, too large amount tends to cause reduction in specific permittivity.

A content of Mg oxide is 4 to 12 moles, preferably 6 to 10 moles and further preferably 7 to 9 moles with respect to 100 moles of $Ba_mTiO_{2+m}$ when calculated as a conversion of MgO. Mg oxide has an effect to control ferroelectricity of $Ba_mTiO_{2+m}$. Too small content of Mg oxide tends to cause increase in electrostriction when applying a voltage in addition to reduction of capacitance-temperature characteristic and withstand pressure. On the other hand, too large content tends to cause deterioration in lifetime characteristics and withstand pressure as well as reduction in specific permittivity.

A content of R oxide is 4 to 15 moles, preferably 6 to 12 moles and further preferably 7 to 11 moles with respect to 100 moles of $Ba_mTiO_{2+m}$ when calculated as a conversion of $R_2O_3$. R oxide mainly has an effect to control ferroelectricity of $Ba_mTiO_{2+m}$. Too small content of R oxide tends to cause reduction in withstand pressure and increase in electrostriction when applying a voltage. On the other hand, too large content tends to cause reduction in specific permittivity. Note that R element constituting the above R oxide is at least one selected from Sc, Y, La, Ce, Pr, Nd, Pm, Sm, Eu, Gd, Tb, Dy, Ho, Er, Tm, Yb and Lu, and among them, Gd is particularly preferable.

A content of an oxide of Mn, Cr, Co and Fe is 0.5 to 3 moles, preferably 0.5 to 2.5 moles and further preferably 1.0 to 2.0 moles with respect to 100 moles of $Ba_mTiO_{2+m}$ when calculated as a conversion of MnO, $Cr_2O_3$, $Co_3O_4$ or $Fe_2O_3$. Too small contents of these oxides tend to deteriorate lifetime characteristics. On the other hand, too large contents tend to cause deterioration in capacitance-temperature characteristics as well as reduction in specific permittivity.

A content of an oxide of Si, Li, Al, Ge and B is 3 to 9 moles, preferably 4 to 8 moles and further preferably 4 to 6 moles with respect to 100 moles of $Ba_mTiO_{2+m}$ when calculated as a conversion of $SiO_2$, $Li_2O_3$, $Al_2O_3$, $Ge_2O_2$ or $B_2O_3$. Too small contents of these oxides tend to cause deterioration in lifetime characteristics as well as reduction in specific permittivity. On the other hand, too large contents tend to deteriorate capacitance-temperature characteristics. Note that among the above oxides, due to its large improvement effects in properties, an oxide of Si is preferable to be used.

In the present embodiment, by including the above predetermined contents of the above components in the dielectric ceramic composition, it is possible to obtain the dielectric ceramic composition able to be fired in a reducing atmosphere, less in electrostriction when applying a voltage, and good in capacitance-temperature characteristics, specific permittivity, withstand pressure and accelerated lifetime of insulation resistance. Especially, it allows to effectively alleviate problems caused by $Ba_mTiO_{2+m}$ included mainly as a base material, such as capacitance-dependence to applied voltage and electrostrictive phenomenon when applying a voltage. In addition, because in the present embodiment the content of $Ba_nZrO_{2+n}$ is relatively large, it is possible to improve capacitance-temperature characteristics and withstand pressure while maintaining the above properties well.

Note that in the present description, each oxide or composite oxide constituting the respective component is described in stoichiometric composition, but oxidation state of each oxide or composite oxide may be slightly deviate from the stoichiometric composition. Note that the above ratio of each component is obtained by calculating amounts of metals included in the oxide or composite oxide constituting the respective component as a conversion of the above stoichiometric composition of the oxide or composite oxide.

The thickness of the dielectric layer 2 is not particularly limited, and may be properly determined based on the application of the multilayer ceramic capacitor 1.

Internal Electrode Layer 3

As a conducting material included in the internal electrode layer 3, although not particularly limited, relatively inexpensive base metal can be used since constituent materials of the dielectric layer 2 have resistance to reduction. The base metal used as the conducting material is preferably Ni or Ni alloy. As the Ni alloy, it is preferable to use an alloy of Ni with one or more elements selected from Mn, Cr, Co and Al. The content of Ni in the alloy is preferably 95 wt % or more. Note that various trace components such as P may be included approximately in an amount of 0.1 wt % or less in the Ni or Ni alloy. Also, the internal electrode layer 3 may be formed by using commercial electrode paste. The thickness of the internal electrode layer 3 may be properly determined in accordance with application, etc.

External Electrode 4

As a conducting material included in the external electrode 4, although not particularly limited, in the present invention, inexpensive Ni, Cu or their alloys can be used. The thickness of the external electrode 4 may be properly determined in accordance with application, etc.

Production Method of Multilayer Ceramic Capacitor 1

The multilayer ceramic capacitor 1 of the present embodiment is produced, as with traditional multilayer ceramic capacitors, by forming a green chip by a usual printing method or sheet method wherein a paste is used, followed by firing, and printing or transferring an external electrode, followed by firing. Hereinafter, the production method will be specifically described.

First, dielectric materials (dielectric ceramic composition powder) included in a dielectric layer paste is prepared to make a paste, so that the dielectric layer paste is obtained. The dielectric layer paste may be organic paste obtained by kneading dielectric materials and organic vehicle, or water-based paste.

As the dielectric materials, in addition to the above-mentioned oxides, the mixture thereof, and composite oxides of the respective components, it may be possible to properly select from various other compounds to become the above-mentioned oxides or composite oxides by firing, for example, carbonate, oxalate, nitrate, hydroxide, organic metallic compounds, etc., to use by mixing. The content of each compound in the dielectric materials may be determined so as to have the above-mentioned compositions of the dielectric ceramic composition after firing. An average particle size of the dielectric materials before forming the paste is usually 0.1 to 1 μm or so.

Also, among the materials of the above components, for at least a part of the materials other than $Ba_mTiO_{2+m}$, each oxide or composite oxide, or a compound to become each oxide or composite oxide by firing may be used directly, or used as partially calcined powders after calcine. Alternatively, a part of the materials other than $Ba_mTiO_{2+m}$ may be calcined with $Ba_nZrO_{2+n}$. However, calcine with $Ba_mTiO_{2+m}$ and $Ba_nZrO_{2+n}$, which can make it hard to obtain effects of the present invention, is not preferable.

Note that as a material of $Ba_mTiO_{2+m}$, it is preferable to use those with an average particle size of preferably 0.2 to 1 μm. Also, it is preferable to use those with an average particle size of preferably 0.2 to 1 μm as other materials such as $Ba_nZrO_{2+n}$. Note that the average particle size is preferably within the above range when using partially calcined powders after calcine.

The organic vehicle is obtained by dissolving a binder in an organic solvent. The binder used in the organic vehicle is not particularly limited, and may be properly selected from a variety of usual binders such as ethylcellulose and polyvinyl butyral. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric layer paste, dielectric materials can be kneaded with a water-based vehicle obtained by dissolving an aqueous binder and dispersant in water. The aqueous binder used for water-based vehicle is not particularly limited, and for example, polyvinyl alcohol, cellulose, aqueous acrylic resin, etc., may be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle.

An external electrode paste may be obtained as with the above-mentioned internal electrode layer paste.

The content of organic vehicle in each of the above-mentioned pastes is not particularly limited, and may be usual content, for example, 1 to 5 wt % or so of the binder and 10 to 50 wt % or so of the solvent. Also, in each paste, there may be included additives selected from a variety of dispersants, plasticizer, dielectric, insulators, etc., if needed. The total amount of these is preferably 10 wt % or less.

When using the printing method, dielectric layer paste and internal electrode layer paste are alternately printed on a substrate such as PET to form layers, and after cutting to a predetermined shape, a green chip is obtained by removing from the substrate.

Also, when using the sheet method, a green sheet is formed by using dielectric layer paste, internal electrode layer paste is printed thereon, and then, these are stacked to form a green chip.

Before firing, the green chip is subject to binder removal treatment. The binder removal conditions include temperature rising rate of preferably 5 to 300° C./hour, holding temperature of preferably 180 to 400° C., and temperature holding time of preferably 0.5 to 24 hours. Also, firing atmosphere is the air or reduced atmosphere.

The atmosphere at firing of the green chip may be properly determined in accordance with a type of the conducting material in the internal electrode layer paste. When using base metal including Ni and Ni alloy as the conducting material, oxygen partial pressure in the firing atmosphere is preferably $10^{-14}$ to $10^{-10}$ MPa. When the oxygen partial pressure is below the above range, abnormal sintering may be caused in the conducting material in the internal electrode layer, resulting in an electrode breaking. Also, when the oxygen partial pressure exceeds the above range, the internal electrode layer tends to be oxidized.

Also, holding temperature at firing is preferably 1000 to 1400° C., more preferably 1100 to 1360° C. When the holding temperature is below the above range, densification may be insufficient. When it exceeds the above range, abnormal sintering of the internal electrode layer may cause an electrode breaking, capacitance-temperature characteristics may deteriorate due to dispersion of the material constituting the internal electrode layer, and the dielectric ceramic composition may be easily reduced.

Additional firing conditions include: temperature rising rate of preferably 50 to 500° C./hour, more preferably 200 to 300° C./hour; temperature holding time of preferably 0.5 to 8 hours, more preferably 1 to 3 hours; and cooling rate of preferably 50 to 500° C./hour, more preferably 200 to 300° C./hour. Also, firing atmosphere is preferably a reducing atmosphere, and as atmosphere gas, for example, a wet mixed gas of $N_2$ and $H_2$ may be used.

After firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

Holding temperature at annealing is preferably 1100° C. or less, particularly preferably 500 to 1100° C. When the holding temperature is below the above range, the dielectric layer may not be sufficiently oxidized, often resulting in lowering IR and shortening high temperature accelerated lifetime. On the other hand, when the holding temperature exceeds the above range, the internal electrode layer is not only oxidized to reduce the capacitance, but also reacts with the dielectric body itself, which may easily cause deteriorated capacitance-temperature characteristics, reduced IR, and reduction in high temperature accelerated lifetime. Note that the annealing may consist of a temperature rising process and temperature falling process. Namely, the temperature holding time may be zero. In this case, the holding temperature is same as the maximum temperature.

Additional annealing conditions include: temperature holding time of preferably 0 to 20 hours, more preferably 2 to 10 hours; and cooling rate of preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter, etc., may be used to wet the $N_2$ gas and mixed gas, for example. In this case, the water temperature is preferably 5 to 75° C. or so. Also, the binder removal treatment, firing and annealing may be performed continuously or independently.

Thus obtained capacitor device body is then subject to end surface polishing, for example, by barrel-polishing or sand blasting, and the external electrode paste is pasted thereon, followed by firing, so that the external electrode 4 is formed.

If needed, a covering layer may be formed on the surface of the external electrode 4 by plating, etc.

Thus produced multilayer ceramic capacitor of the present embodiment is mounted on the printed-circuit board, etc., by soldering, etc., to be used in a variety of electronic devices, etc.

Second Embodiment

A multilayer ceramic capacitor according to the second embodiment of the present invention and a production method thereof are same in the compositions of the dielectric ceramic composition and its production method as the dielectric ceramic composition according to the first embodiment, except for the following points, and explanation of the overlapped contents will be eliminated.

The dielectric ceramic composition according to the second embodiment comprises:

a first component expressed by a formula $(Ba_a R_b)_\alpha (Ti_c Zr_d Mg_e)O_3$, a second component comprised of an oxide of at least one element selected from Mn, Cr, Co and Fe, and a third component comprised of an oxide of at least one element selected from Si, Li, Al, Ge and B. In the above formula, R is rare-earth element as with the first embodiment, and is preferably Gd.

In the above formula, $0.8 \leq a \leq 0.96$, preferably $0.83 \leq a \leq 0.93$ and further preferably $0.86 \leq a \leq 0.91$;

$0.04 \leq b \leq 0.2$, preferably $0.08 \leq b \leq 0.15$ and further preferably $0.09 \leq b \leq 0.13$;

$0.55 \leq c \leq 0.7$, preferably $0.62 \leq c \leq 0.69$ and further preferably $0.64 \leq c \leq 0.68$;

$0.24 \leq d \leq 0.39$, preferably $0.26 \leq d \leq 0.36$ and further preferably $0.27 \leq d \leq 0.31$ $0.02 \leq e \leq 0.09$, preferably $0.03 \leq e \leq 0.08$ and further preferably $0.04 \leq e \leq 0.07$; and $1 \leq \alpha \leq 1.15$, preferably $1.02 \leq \alpha \leq 1.12$ and further preferably $1.03 \leq \alpha \leq 1.10$.

The dielectric ceramic composition includes, with respect to 100 moles of $Ba_m TiO_{2+m}$ wherein "m" satisfies $0.99 \leq m \leq 1.01$) included in the first component, 0.5 to 3.0 moles of the second component when calculated as a conversion of the oxide, and 3 to 9 moles of the third component when calculated as a conversion of the oxide.

In the dielectric ceramic composition according to the present embodiment after firing, $Ba_m TiO_{2+m}$ included in the first component is sufficiently solid-dissolved in the perovskite-type crystal structure. The rare earth R is present in the "A" site and Zr and Mg are present in the "B" site.

In the above formula, when "a" is too small, specific permittivity tends to be reduced; and when "a" is too large, temperature characteristic, high temperature accelerated lifetime, breakdown voltage and amount of electrostriction tend to decline. Also, when "b" is too large, specific permittivity tends to be reduced; and when "b" is too small, temperature characteristic, high temperature accelerated lifetime, breakdown voltage and amount of electrostriction tend to decline.

In the above formula, when "c" is too large, specific permittivity tends to be reduced; and when "c" is too small, temperature characteristic, high temperature accelerated lifetime, breakdown voltage and amount of electrostriction tend to decline. Also, when "d" is too large, specific permittivity tends to be reduced; and when "d" is too small, temperature characteristic, high temperature accelerated lifetime and amount of electrostriction tend to decline.

In the above formula, when "e" is too large, temperature characteristic tends to deteriorate; and "e" is too small, high temperature accelerated lifetime tends to decline. Further, when α is too small, temperature characteristic tends to deteriorate; and when α is too large, reliability tends to decline.

Also, in the present embodiment, when an amount of the second component is too small, temperature characteristic, high temperature accelerated lifetime, breakdown voltage and amount of electrostriction tend to decline; and when too large, specific permittivity tends to be reduced. Also, when an amount of the third component is too small, high temperature accelerated lifetime, breakdown voltage and amount of electrostriction tend to decline; and when too large, specific permittivity tends to be reduced.

To produce the dielectric ceramic composition of the present embodiment, the same procedure can be employed as that of the above-mentioned dielectric ceramic composition according to the first embodiment. Preferably, among the materials of the above components, for at least a part of the material of each component other than $Ba_mTiO_{2+m}$, each oxide or composite oxide, or a compound to become each oxide or composite oxide by firing are preliminarily calcined to form a partially calcined powder before use.

Other constitutions and effects of the present embodiment are same as those of the first embodiment.

Hereinbefore, embodiments of the present invention are described, but the present invention is not limited to the above-mentioned embodiments and can be variously modified within the scope of the present invention.

For example, in the above-mentioned embodiments, a multilayer ceramic capacitor is exemplified as an electronic device according to the present invention. However, the electronic device according to the present invention is not limited to the multilayer ceramic capacitor and may be any comprising the dielectric layer constituted by the dielectric ceramic composition produced by the above method.

EXAMPLES

Hereinafter, the present invention will be described based on the further detailed examples, but the present invention is not limited to the examples.

Example 1

At first, $Ba_mTiO_{2+m}$ with an average particle size of 0.5 μm, $Ba_nZrO_{2+n}$, $MgCO_3$, $Gd_2O_3$, MnO, and $SiO_2$ were prepared and mixed by a ball mill. The obtained mixture of the powders was preliminarily calcined at 1200° C. to obtain calcined powders with an average particle size of 0.6 μm. Then, the obtained calcined powders were wet pulverized by a ball mill for 15 hours, and then dried to obtain a dielectric material. Note that $MgCO_3$ became MgO in the dielectric ceramic composition after firing. Also, the state of the powders are not limited, and for example, $Ba_nZrO_{2+n}$, $MgCO_3$, $Gd_2O_3$, MnO and $SiO_2$ may be solid-dissolved within $Ba_mTiO_{2+m}$, $MgCO_3$, $Gd_2O_3$, MnO and $SiO_2$ may be diffused in the surface of $Ba_mTiO_{2+m}$, or $MgCO_3$ particles, $Gd_2O_3$ particles, MnO particles and $SiO_2$ particles may be firmly fixed on the surface of $Ba_mTiO_{2+m}$. The powder produced by this method was defined as powder "A".

The amount of each component is shown in Table 1. In the present example, as shown in Table 1, different amounts of dielectric materials (sample no. 1 to 35) were prepared. In Table 1, the amount of each component is calculated as a conversion of composite oxide or each oxide with respect to 100 moles of $Ba_mTiO_{2+m}$. Also, in the present example, $Ba_mTiO_{2+m}$ with m=1.001 and $Ba_nZrO_{2+n}$ with n=1.000 were used.

Then, 100 parts by weight of the obtained dielectric materials, 10 parts by weight of polyvinyl butyral resin, 5 parts by weight of dioctyl phthalate (DOP) as a plasticizer and 100 parts by weight of alcohol as a solvent were mixed by a ball mill to make a paste, so that a dielectric layer paste was obtained.

Also, aside from the above, 44.6 parts by weight of Ni particles, 52 parts by weight of terpineol, 3 parts by weight of ethyl cellulose and 0.4 part by weight of benzotriazole were kneaded by triple rolls to slurry, so that an internal electrode layer paste was obtained.

Then, by using the above-obtained dielectric layer paste, on a PET film, a green sheet was formed so as to have a thickness after drying of 30 μm. Next, by using the internal electrode layer paste, an electrode layer was printed in a predetermined pattern thereon, followed by removing the sheet from the PET film, so that the green sheet having the electrode layer was obtained. A plurality of green sheets having the electrode layer were stacked and adhered by pressure to obtain a green stacking body. The green stacking body was cut in a predetermined size to obtain a green chip.

Then, the obtained green chip was subject to binder removal treatment, firing and annealing in the following conditions, to obtain a multilayer ceramic fired body.

The binder removal treatment was performed at temperature rising rate: 25° C./hour, holding temperature: 260° C., temperature holding time: 8 hours, and atmosphere: in the air.

The firing was performed at temperature rising rate: 200° C./hour, holding temperature: 1220 to 1380° C., temperature holding time: 2 hours, cooling rate: 200° C./hour, and atmosphere gas: wet mixed $N_2+H_2$ gas (oxygen partial pressure: $10^{-12}$ MPa).

The annealing was performed at temperature rising rate: 200° C./hour, holding temperature: 1000 to 1100° C., temperature holding time: 2 hours, cooling rate: 200° C./hour, and atmosphere gas: wet $N_2$ gas (oxygen partial pressure: $10^{-7}$ MPa). Note that a wetter was used to wet the atmosphere gas at the firing and annealing.

After polishing end faces of the obtained multilayer ceramic fired body with sandblast, In—Ga was coated as an external electrode to obtain a sample of the multilayer ceramic capacitor shown in FIG. 1. In the present example, as shown in Table 1, a plurality of capacitor samples (sample no. 1 to 35) wherein dielectric layers were constituted by a plurality of dielectric ceramic compositions with different compositions was produced. The size of the obtained capacitor sample was 3.2 mm×1.6 mm×3.2 mm; the thickness of the dielectric layer was 20 μm; the thickness of the internal layer was 1.5 μm; and the number of the dielectric layers sandwiched by the internal electrode layers was 10.

For the obtained capacitor sample, a specific permittivity (∈s), capacitance-temperature characteristic (TC), high temperature accelerated lifetime (HALT), breakdown voltage (withstand pressure) and amount of electrostriction when applying a voltage were evaluated.

Specific Permittivity ∈s

For the capacitor sample, capacitance "C" at reference temperature of 25° C. was measured with digital LCR meter (4284A by YHP) under the conditions of frequency at 1 kHz and input signal level (measured voltage) at 1 Vrms. Then, a specific permittivity ∈s (no unit) was calculated based on the thickness of the dielectric layer, effective electrode area and the obtained capacitance "C". The higher specific permittivity is more preferable, and in the present example, those of 230 or more, preferably 250 or more, were evaluated as GOOD. The results are shown in Table 1.

Capacitance-Temperature Characteristic TC

For the capacitor sample, capacitance at 125° C. was measured with digital LCR meter (4284A by YHP) under the conditions of frequency at 1 kHz and input signal level (measured voltage) at 1 Vrms to calculate the change rate to the capacitance at reference temperature of 25° C. In the present example, samples satisfying capacitor change rate within ±15% were evaluated as GOOD. The results are shown in Table 1.

High Temperature Accelerated Lifetime (HALT)

For the capacitor sample, high temperature accelerated lifetime (HALT) was evaluated by measuring lifetime at 200° C. while applying a voltage under electric field at 40V/μm. In the present example, time from starting of applying the voltage until dropping the insulating resistance by 1 digit was defined as lifetime. Also, the lifetime test was performed on 10 capacitor samples. In the present example, the lifetime of 10 hours or longer, preferably 20 hours or longer, was evaluated as GOOD. The results are shown in Table 1.

Breakdown Voltage (Withstand Pressure)

Breakdown voltage was defined as the value of the voltage (unit: V/μm) with respect to the thickness of the dielectric layer at electric current of 10 mA when applying a DC voltage at 25° C. at voltage rising rate of 100V/sec to the capacitor sample. By measuring the breakdown voltage, withstand pressure of the capacitor sample was evaluated. In the present example, the breakdown voltage of 50 V/μm or more was defined as GOOD. The results are shown in Table 1.

Electrostriction Caused by Applying a Voltage

First, the capacitor sample was solder-mounted to fix on a glass epoxy board wherein an electrode was printed in a predetermined pattern. Then, the capacitor sample mounted on the board was subject to applying a voltage under the conditions of AC at 10 Vrms/μm and frequency at 3 kHz to measure the amplitude of vibration of the surface of the capacitor sample when applying a voltage, which was defined as an amount of electrostriction. Note that a laser Doppler vibrometer was used for the measurements of the amplitude of vibration of the surface of the capacitor sample. Also, in the present example, the amount of electrostriction was defined as an average of measurements for 10 capacitor samples. The lower amount of electrostriction is more preferable, and in the present example, those less than 10 ppm was defined as GOOD. The results are shown in Table 1.

TABLE 1

| Sample No. | $Ba_nZrO_{2+n}$ [mol] | MgO [mol] | $Gd_2O_3$ [mol] | MnO [mol] | $SiO_2$ [mol] | Powder | $\epsilon$ s | TC (125° C.) [%] | High Temperature Accelerated Lifetime [hour] | Breakdown Voltage [V/μm] | Electrostriction [ppm] |
|---|---|---|---|---|---|---|---|---|---|---|---|
| *1 | 20 | 7.7 | 6.8 | 1.5 | 4.2 | A | 354 | *−17 | *7 | *37 | 8 |
| 2 | 35 | 7.8 | 7.1 | 1.6 | 4.8 | A | 317 | −15 | 20 | 52 | 7 |
| 3 | 40 | 8.1 | 6.9 | 1.7 | 4.3 | A | 310 | −13 | 25 | 59 | 8 |
| 4 | 45 | 7.7 | 7.2 | 1.5 | 4.1 | A | 301 | −15 | 24 | 60 | 9 |
| 5 | 55 | 7.8 | 7.0 | 1.5 | 4.4 | A | 285 | −14 | 26 | 62 | 8 |
| 6 | 65 | 8.2 | 7.4 | 1.8 | 4.4 | A | 274 | −13 | 26 | 64 | 7 |
| *7 | 70 | 8.4 | 7.0 | 1.9 | 4.5 | A | *210 | −14 | 27 | 61 | 6 |
| *8 | 40 | 2.0 | 7.1 | 1.4 | 5.0 | A | 413 | *−21 | 24 | *41 | *10 |
| 9 | 41 | 4.0 | 7.4 | 1.3 | 4.9 | A | 326 | −15 | 25 | 57 | 7 |
| 10 | 42 | 7.0 | 7.2 | 1.7 | 4.5 | A | 318 | −13 | 26 | 59 | 8 |
| 11 | 41 | 9.0 | 6.7 | 1.5 | 4.6 | A | 310 | −13 | 25 | 60 | 6 |
| 12 | 40 | 10.5 | 6.8 | 1.6 | 4.4 | A | 306 | −14 | 25 | 58 | 6 |
| 13 | 39 | 12.0 | 7.0 | 1.6 | 4.3 | A | 301 | −14 | 24 | 60 | 7 |
| *14 | 41 | 15.0 | 6.8 | 1.6 | 4.9 | A | *225 | −15 | *7 | *42 | 6 |
| *15 | 38 | 7.2 | 2.0 | 1.5 | 4.3 | A | *510 | *−25 | *8 | *38 | *12 |
| 16 | 43 | 8.1 | 4.0 | 1.4 | 4.5 | A | 393 | −15 | 24 | 58 | 7 |
| 17 | 40 | 8.0 | 6.0 | 1.6 | 4.5 | A | 351 | −14 | 26 | 58 | 8 |
| 18 | 41 | 7.7 | 9.0 | 1.5 | 4.3 | A | 310 | −15 | 24 | 57 | 7 |
| 19 | 39 | 8.0 | 12.0 | 1.6 | 4.6 | A | 277 | −14 | 25 | 58 | 6 |
| 20 | 42 | 8.3 | 15.0 | 1.7 | 4.1 | A | 251 | −13 | 26 | 59 | 7 |
| *21 | 39 | 7.8 | 17.0 | 1.8 | 4.2 | A | *196 | −14 | 25 | 53 | 7 |
| *22 | 42 | 8.4 | 7.1 | 0.2 | 4.6 | A | 340 | −15 | *7 | 52 | 6 |
| 23 | 39 | 7.6 | 6.9 | 0.5 | 4.5 | A | 306 | −14 | 27 | 59 | 7 |
| 24 | 40 | 7.6 | 7.0 | 1.0 | 4.3 | A | 300 | −14 | 27 | 59 | 8 |
| 25 | 41 | 7.8 | 7.2 | 1.5 | 4.4 | A | 296 | −15 | 26 | 58 | 6 |
| 26 | 40 | 7.8 | 7.3 | 2.0 | 4.6 | A | 293 | −14 | 28 | 57 | 7 |
| 27 | 38 | 7.9 | 7.2 | 3.0 | 4.5 | A | 290 | −15 | 29 | 58 | 6 |
| *28 | 41 | 8.1 | 7.2 | 5.0 | 4.0 | A | *194 | *−22 | 29 | 51 | 4 |
| *29 | 42 | 7.8 | 7.3 | 1.5 | 1.5 | A | *223 | −14 | *8 | 57 | 4 |
| 30 | 40 | 7.6 | 7.2 | 1.5 | 3.0 | A | 301 | −13 | 24 | 55 | 7 |
| 31 | 39 | 7.5 | 7.0 | 1.7 | 4.0 | A | 306 | −14 | 25 | 56 | 7 |
| 32 | 41 | 7.6 | 6.9 | 1.6 | 5.0 | A | 320 | −15 | 26 | 57 | 8 |
| 33 | 40 | 7.8 | 7.0 | 1.7 | 7.0 | A | 333 | −15 | 27 | 57 | 8 |
| 34 | 43 | 8.1 | 7.1 | 1.8 | 9.0 | A | 343 | −14 | 26 | 54 | 7 |
| *35 | 41 | 7.8 | 6.7 | 1.9 | 10.0 | A | 411 | *−25 | 28 | 51 | 7 |

Content of each component is calculated with respect to 100 moles of $Ba_mTiO_{2+m}$
Samples with a * mark mean those out of the range of the present invention.

From Table 1, by making the compositions of dielectric ceramic composition within the predetermined ranges of the present invention, it can be confirmed to improve breakdown voltage (withstand pressure) and high temperature accelerated lifetime (HALT) while maintaining good specific permittivity (∈s), capacitance-temperature characteristic (TC) and amount of electrostriction.

On the other hand, it results in inferior properties when making the compositions of dielectric ceramic composition out of the predetermined range of the present invention.

Example 2

Except for using Ba(Ti, Zr)$O_3$, wherein $Ba_mTiO_{2+m}$ and $Ba_nZrO_{2+n}$ were preliminarily calcined, instead of $Ba_mTiO_{2+m}$ and $Ba_nZrO_{2+n}$, and mixing the additive components without calcine, a capacitor sample was produced as with Sample no. 9 of the Example 1, and evaluated as with Example 1. Note that in the present example, an amount of Ba(Ti, Zr)$O_3$ added into the dielectric ceramic composition was same as the total amount of $Ba_mTiO_{2+m}$ and $Ba_nZrO_{2+n}$ in Sample no. 9 of Example 1. Also, Ba(Ti, Zr)$O_3$ with Ti/Zr ratio same as the ratio of $Ba_mTiO_{2+m}$ and $Ba_nZrO_{2+n}$ in Sample no. 9 of Example 1 was used (i.e. Ba(Ti, Zr)$O_3$ with Ti/Zr=about 100/41 was used). The results are shown in Table 2.

TABLE 2

| Sample No. | Configuration of Barium Titanate and Barium Zirconate when adding | ∈s | TC (125° C.) [%] | High Temperature Accelerated Lifetime [hour] | Breakdown Voltage [V/μm] | Electro-striction [ppm] |
| --- | --- | --- | --- | --- | --- | --- |
| 9 | $Ba_mTiO_{2+m}$ + $Ba_nZrO_{2+n}$ | 326 | −15 | 25 | 57 | 7 |
| *36 | Ba(Ti, Zr)$O_3$ | 1209 | −65 | 11 | 30 | 52 |

Content of each component is calculated with respect to 100 moles of $Ba_mTiO_{2+m}$.
Samples with a * mark mean those out of the range of the present invention.

From Table 2, when using Ba (Ti, Zr) $O_3$ instead of $Ba_mTiO_{2+m}$ and $Ba_nZrO_{2+n}$, it can be confirmed that capacitance-temperature characteristic, amount of electrostriction due to applying a voltage and reliability are inferior. Note that its reason is not exactly clear, but it may be caused by the difference in distribution of Gd due to forms of barium titanate and barium zirconate when adding. Namely, $Ba_mTiO_{2+m}$ and $Ba_nZrO_{2+n}$ are separately added in the dielectric ceramic composition of the present invention, which makes Gd easily diffused in the $Ba_mTiO_{2+m}$ particles to give a constitution wherein Gd is uniformly dispersed across the inside of particles. It may allow controlling generation of oxygen defect during firing in a reduced atmosphere, resulting in increased reliability, while using Ba(Ti, Zr)$O_3$ may not cause the above constitution.

Example 3

Except for changing as described below, capacitor samples were produced as with Example 1 using powder "A", and evaluated as with Example 1.

In Tables 3 and 4, unlike Table 1, composition of the dielectric ceramic composition after firing is expressed as below.

Namely, a dielectric ceramic composition according to this example comprises a first component expressed by a formula, $(Ba_aR_b)_\alpha(Ti_cZr_dMg_e)O_3$, a second component including an oxide of at least one element selected from Mn, Cr, Co and Fe, and a third component including an oxide of at least one element selected from Si, Li, Al, Ge and B.

In Tables 3 and 4, molar ratios of the second component (Mn) and the third component (Si) are calculated as a conversion of the respective oxides with respect to 100 moles of $Ba_mTiO_{2+m}$ included in the first component.

From results shown in Tables 3 and 4, by making the composition of the dielectric ceramic composition within the range of the present invention, it can be confirmed to improve breakdown voltage (withstand pressure) and high temperature accelerated lifetime (HALT) while maintaining the specific permittivity (∈s), capacitance-temperature characteristic (TC) and amount of electrostriction well.

In contrast, when making the composition of the dielectric ceramic composition out of the range of the present invention, the results were inferior in each property.

Example 4

First, $Ba_mTiO_{2+m}$ (note that m=1.001) with an average particle size of 0.5 μm, $Ba_nZrO_{2+n}$ (note that n=1.000), $MgCO_3$, $Gd_2O_3$, MnO and $SiO_2$ were prepared, and mixed with a ball mill to obtain a mixture of powders. The powder obtained from this production method was defined as powder "B".

Except for using the powder "B" instead of the powder "A", capacitor samples were produced and evaluated as with Example 3. The amount of each component added in the powder "B" and results of evaluation are shown in Table 5.

From the results of Table 5 compared to Tables 3 and 4, when using the powder "B", similar results were obtained with those when using the powder "A". However, when comparing those with similar compositions, it is confirmed that samples wherein the powder "A" was used are superior in high temperature accelerated lifetime and breakdown voltage to samples wherein the powder "B" was used.

Example 5

$BaCO_3$, $ZrO_2$, $MgCO_3$, $Gd_2O_3$, MnO, $SiO_2$ and $TiO_2$ were prepared, mixed by a ball mill for 15 hours, wet-pulverized and dried to obtain dielectric materials. The powder obtained from this production method was defined as powder "C".

Except for using the powder "C" instead of the powder "A", a capacitor sample was produced and evaluated as with Example 3. The amount of each component added in the powder "C" and results of evaluation are shown in Table 5. As shown in Table 5, when using the powder "C", similar results were obtained with those when using the powder "A".

Example 6

MgCO$_3$, Gd$_2$O$_3$, MnO, and SiO$_2$ were preliminarily calcined at 1000° C., wet-pulverized with BaCO$_3$, ZrO$_2$ and TiO$_2$ powders with an average particle size of 0.3 μm by a ball mill for 15 hours, and dried to obtain dielectric materials. The powder obtained from this production method was defined as powder "D".

Except for using the powder "D" instead of the powder "A", a capacitor sample was produced and evaluated as with Example 3. The amount of each component added in the powder "D" and results of evaluation are shown in Table 5. As shown in Table 5, when using the powder "D", similar results were obtained with those when using the powder "A".

TABLE 3

| Sample No. | Ba a | Gd b | Ti c | Zr d | Mg e | Mn | Si | Powder | ε s | TC (125° C.) [%] | High Temperature Accelerated Lifetime | Breakdown Voltage [V/μm] | Electro-striction [ppm] |
|---|---|---|---|---|---|---|---|---|---|---|---|---|---|
| *40 | 0.79 | 0.21 | 0.67 | 0.28 | 0.05 | 1.7 | 4.2 | A | *242 | −12 | 29 | 55 | 7 |
| 41 | 0.80 | 0.20 | 0.58 | 0.38 | 0.04 | 1.9 | 4.5 | A | 267 | −13 | 28 | 57 | 6 |
| 42 | 0.86 | 0.14 | 0.60 | 0.35 | 0.05 | 1.5 | 4.4 | A | 288 | −14 | 27 | 58 | 5 |
| 43 | 0.89 | 0.11 | 0.67 | 0.29 | 0.04 | 1.6 | 4.8 | A | 305 | −14 | 27 | 56 | 7 |
| 44 | 0.92 | 0.08 | 0.62 | 0.30 | 0.08 | 1.5 | 4.5 | A | 327 | −14 | 26 | 58 | 6 |
| 45 | 0.96 | 0.04 | 0.60 | 0.36 | 0.04 | 1.6 | 4.2 | A | 358 | −15 | 25 | 52 | 5 |
| *46 | 0.99 | 0.01 | 0.64 | 0.32 | 0.04 | 1.9 | 4.6 | A | 425 | *−18 | *17 | *39 | *10 |
| *47 | 0.86 | 0.14 | 0.73 | 0.24 | 0.03 | 1.4 | 4.9 | A | *248 | −12 | 29 | 57 | 5 |
| 48 | 0.89 | 0.11 | 0.70 | 0.27 | 0.03 | 1.5 | 4.4 | A | 266 | −14 | 31 | 58 | 6 |
| 49 | 0.91 | 0.09 | 0.66 | 0.30 | 0.04 | 1.3 | 4.2 | A | 276 | −13 | 29 | 56 | 5 |
| 50 | 0.93 | 0.07 | 0.63 | 0.32 | 0.05 | 1.9 | 4.3 | A | 304 | −14 | 28 | 57 | 7 |
| 51 | 0.84 | 0.16 | 0.60 | 0.36 | 0.04 | 1.6 | 4.6 | A | 336 | −15 | 26 | 58 | 7 |
| 52 | 0.87 | 0.13 | 0.55 | 0.39 | 0.06 | 1.8 | 4.8 | A | 364 | −15 | 25 | 53 | 8 |
| *53 | 0.90 | 0.10 | 0.53 | 0.39 | 0.08 | 1.4 | 4.2 | A | 459 | *−17 | *18 | *38 | *11 |
| *54 | 0.93 | 0.07 | 0.70 | 0.23 | 0.07 | 1.5 | 4.2 | A | 423 | *−18 | *17 | 58 | *11 |
| 55 | 0.88 | 0.12 | 0.69 | 0.24 | 0.07 | 1.3 | 4.5 | A | 367 | −15 | 26 | 59 | 8 |
| 56 | 0.91 | 0.09 | 0.67 | 0.29 | 0.04 | 1.4 | 4.6 | A | 312 | −14 | 28 | 56 | 6 |
| 57 | 0.92 | 0.08 | 0.61 | 0.32 | 0.07 | 1.5 | 4.3 | A | 299 | −15 | 29 | 59 | 8 |
| 58 | 0.95 | 0.05 | 0.60 | 0.36 | 0.04 | 1.6 | 4.8 | A | 287 | −14 | 30 | 58 | 7 |
| 59 | 0.91 | 0.09 | 0.58 | 0.39 | 0.03 | 1.6 | 4.7 | A | 266 | −14 | 30 | 57 | 8 |
| *60 | 0.87 | 0.13 | 0.56 | 0.41 | 0.03 | 1.9 | 4.6 | A | *234 | −13 | 29 | 58 | 6 |
| *61 | 0.87 | 0.13 | 0.62 | 0.29 | 0.09 | 1.8 | 4.8 | A | 306 | *−17 | 28 | 54 | 6 |
| 62 | 0.88 | 0.12 | 0.58 | 0.35 | 0.07 | 1.7 | 4.8 | A | 309 | −15 | 31 | 55 | 6 |
| 63 | 0.94 | 0.06 | 0.61 | 0.32 | 0.07 | 1.4 | 4.0 | A | 311 | −15 | 31 | 58 | 7 |
| 64 | 0.94 | 0.06 | 0.65 | 0.30 | 0.05 | 1.3 | 4.5 | A | 302 | −14 | 29 | 56 | 7 |
| 65 | 0.85 | 0.15 | 0.66 | 0.30 | 0.04 | 1.5 | 4.3 | A | 299 | −13 | 27 | 57 | 8 |
| 66 | 0.88 | 0.12 | 0.68 | 0.30 | 0.02 | 1.6 | 4.7 | A | 315 | −13 | 26 | 53 | 6 |
| *67 | 0.90 | 0.10 | 0.70 | 0.29 | 0.01 | 1.5 | 4.6 | A | 308 | −12 | *18 | 51 | 7 |

Composition of each component a, b, c, d and e corresponds to a formula (Ba$_a$Gd$_b$)$_α$(Ti$_c$Zr$_d$Mg$_e$)O$_3$
In the present example, those with α = 1.060 were used.
Samples with a * mark mean those out of the range of the present invention.

TABLE 4

Table 4

| Sample No. | Ba a | Gd b | Ti c | Zr d | Mg e | Mn | Si | Powder | ε s | TC (125° C.) [%] | High Temperature Accelerated Lifetime | Breakdown Voltage [V/μm] | Electro-striction [ppm] |
|---|---|---|---|---|---|---|---|---|---|---|---|---|---|
| *68 | 0.91 | 0.09 | 0.65 | 0.30 | 0.05 | 0.3 | 4.6 | A | 412 | *−18 | *18 | *39 | *10 |
| 69 | 0.89 | 0.11 | 0.65 | 0.31 | 0.04 | 0.5 | 4.5 | A | 367 | −15 | 27 | 57 | 5 |
| 70 | 0.87 | 0.13 | 0.62 | 0.33 | 0.05 | 1.0 | 4.5 | A | 324 | −14 | 28 | 58 | 6 |
| 71 | 0.91 | 0.09 | 0.64 | 0.32 | 0.04 | 1.5 | 4.3 | A | 305 | −15 | 28 | 56 | 5 |
| 72 | 0.92 | 0.08 | 0.68 | 0.28 | 0.04 | 2.0 | 4.9 | A | 290 | −13 | 27 | 57 | 7 |
| 73 | 0.89 | 0.11 | 0.64 | 0.30 | 0.07 | 3.0 | 4.0 | A | 283 | −14 | 29 | 58 | 7 |
| *74 | 0.89 | 0.11 | 0.60 | 0.34 | 0.06 | 4.0 | 4.2 | A | *233 | −13 | 28 | 53 | 8 |
| *75 | 0.92 | 0.08 | 0.62 | 0.31 | 0.07 | 1.4 | 2.0 | A | *240 | −15 | *19 | *38 | *10 |
| 76 | 0.93 | 0.07 | 0.64 | 0.32 | 0.04 | 1.6 | 3.0 | A | 277 | −14 | 26 | 58 | 5 |
| 77 | 0.90 | 0.10 | 0.58 | 0.37 | 0.05 | 1.9 | 3.5 | A | 287 | −15 | 25 | 57 | 6 |
| 78 | 0.89 | 0.11 | 0.64 | 0.31 | 0.05 | 1.8 | 4.5 | A | 305 | −13 | 30 | 55 | 5 |
| 79 | 0.88 | 0.12 | 0.65 | 0.29 | 0.06 | 1.5 | 6.0 | A | 319 | −14 | 29 | 58 | 7 |
| 80 | 0.87 | 0.13 | 0.65 | 0.28 | 0.07 | 1.6 | 9.0 | A | 355 | −15 | 28 | 56 | 7 |
| *81 | 0.91 | 0.09 | 0.61 | 0.34 | 0.05 | 1.5 | 10.0 | A | 394 | −14 | 27 | 57 | 8 |

Composition of each component a, b, c, d and e corresponds to a formula (Ba$_a$Gd$_b$)$_α$(Ti$_c$Zr$_d$Mg$_e$)O$_3$
In the present example, those with α = 1.060 were used.
Samples with a * mark mean those out of the range of the present invention.

TABLE 5

| Sample No. | Ba a | Gd b | Ti c | Zr d | Mg e | Mn | Si | Powder | $\epsilon s$ | TC (125° C.) [%] | High Temperature Accelerated Lifetime [hour] | Breakdown Voltage [V/μm] | Electro-striction [ppm] |
|---|---|---|---|---|---|---|---|---|---|---|---|---|---|
| 82 | 0.88 | 0.12 | 0.63 | 0.32 | 0.05 | 1.4 | 4.3 | B | 308 | −14 | 23 | 53 | 6 |
| 83 | 0.89 | 0.11 | 0.65 | 0.31 | 0.04 | 1.9 | 4.7 | B | 302 | −15 | 21 | 54 | 6 |
| 84 | 0.89 | 0.11 | 0.64 | 0.30 | 0.06 | 1.8 | 4.6 | B | 298 | −14 | 22 | 52 | 7 |
| 85 | 0.91 | 0.09 | 0.68 | 0.28 | 0.04 | 1.7 | 4.3 | B | 310 | −13 | 23 | 51 | 7 |
| 86 | 0.90 | 0.10 | 0.68 | 0.27 | 0.05 | 1.4 | 4.8 | B | 289 | −14 | 24 | 54 | 8 |
| 87 | 0.91 | 0.09 | 0.65 | 0.29 | 0.06 | 1.5 | 4.9 | B | 295 | −15 | 22 | 52 | 6 |
| 88 | 0.88 | 0.12 | 0.61 | 0.34 | 0.05 | 1.8 | 4.2 | C | 301 | −13 | 22 | 57 | 7 |
| 89 | 0.88 | 0.12 | 0.63 | 0.32 | 0.05 | 1.4 | 4.3 | D | 306 | −14 | 22 | 53 | 7 |

Composition of each component a, b, c, d and e corresponds to a formula $(Ba_aGd_b)_\alpha(Ti_cZr_dMg_e)O_3$ In the present example, those with $\alpha = 1.060$ were used.

Samples with a * mark mean those out of the range of the present invention.

Example 7

Except for using $Cr_2O_3$, $CO_3O_4$ or $Fe_2O_3$ as an alternative to MnO, and $Li_2O_3$, $Al_2O_3$, $Ge_2O_2$ or $B_2O_3$ as an alternative to $SiO_2$, capacitor samples were produced and evaluated as with Example 3. The amount of each component added and results of evaluation are shown in Table 6.

As shown in Table 6, when using $Cr_2O_3$, $CO_3O_4$ or $Fe_2O_3$ as an alternative to MnO, and $Li_2O_3$, $Al_2O_3$, $Ge_2O_2$ or $B_2O_3$ as an alternative to $SiO_2$, it can be confirmed to obtain similar properties.

Example 8

Except for changing values of α in $(Ba_aGd_b)_\alpha(Ti_cZr_dMg_e)O_3$ within the range of 0.08 to 1.20 in the production method of the powder "A" of Example 3, capacitor samples were produced and evaluated as with Example 3. The amount of each component added and results of evaluation are shown in Table 7.

As shown in Table 7, when α is within the range of $1.00 \leq \alpha \leq 1.15$, it can be confirmed to obtain preferable properties.

TABLE 6

| Sample No. | Ba a | Gd b | Ti c | Zr d | Mg e | 2nd component type | 2nd component amt | 3rd component type | 3rd component amt | Powder | $\epsilon s$ | TC (125° C.) [%] | High Temperature Accelerated Lifetime [hour] | Breakdown Voltage [V/μm] | Electro-striction [ppm] |
|---|---|---|---|---|---|---|---|---|---|---|---|---|---|---|---|
| 90 | 0.95 | 0.05 | 0.67 | 0.30 | 0.03 | Mn | 1.9 | Si | 4.5 | A | 267 | −13 | 28 | 57 | 6 |
| 91 | 0.89 | 0.11 | 0.58 | 0.35 | 0.07 | Cr | 1.5 | Si | 4.4 | A | 288 | −14 | 27 | 58 | 5 |
| 92 | 0.91 | 0.09 | 0.67 | 0.29 | 0.04 | Co | 1.6 | Si | 4.8 | A | 305 | −14 | 27 | 56 | 7 |
| 93 | 0.93 | 0.07 | 0.62 | 0.32 | 0.06 | Fe | 1.5 | Si | 4.5 | A | 327 | −14 | 26 | 58 | 6 |
| 94 | 0.82 | 0.18 | 0.60 | 0.36 | 0.04 | Mn | 1.6 | Li | 4.2 | A | 358 | −15 | 25 | 52 | 5 |
| 95 | 0.86 | 0.14 | 0.69 | 0.27 | 0.04 | Mn | 1.5 | Al | 4.4 | A | 266 | −14 | 31 | 58 | 6 |
| 96 | 0.89 | 0.11 | 0.66 | 0.29 | 0.05 | Mn | 1.3 | Ge | 4.2 | A | 276 | −13 | 29 | 56 | 5 |
| 97 | 0.92 | 0.08 | 0.63 | 0.30 | 0.07 | Mn | 1.9 | B | 4.3 | A | 304 | −14 | 28 | 57 | 7 |

Composition of each component a, b, c, d and e corresponds to a formula $(Ba_aGd_b)_\alpha(Ti_cZr_dMg_e)O_3$ In the present example, those with $\alpha = 1.060$ were used.

Samples with a * mark mean those out of the range of the present invention.

TABLE 7

Table 7

| Sample No. | Ba a | Gd b | Ti c | Zr d | Mg e | α | Mn | Si | Powder | $\epsilon$ s | TC (125° C.) [%] | High Temperature Accelerated Lifetime [hour] | Breakdown Voltage [V/μm] | Electrostriction [ppm] |
|---|---|---|---|---|---|---|---|---|---|---|---|---|---|---|
| *98a | 0.89 | 0.11 | 0.63 | 0.29 | 0.08 | 0.08 | 1.7 | 4.5 | A | 310 | −15 | *8 | *42 | 6 |
| 98b | 0.88 | 0.12 | 0.65 | 0.28 | 0.07 | 1.00 | 1.8 | 4.3 | A | 321 | −14 | 26 | 58 | 5 |
| 99 | 0.90 | 0.10 | 0.59 | 0.33 | 0.08 | 1.02 | 1.9 | 4.7 | A | 305 | −15 | 25 | 56 | 6 |
| 100 | 0.86 | 0.14 | 0.63 | 0.30 | 0.07 | 1.04 | 1.6 | 4.4 | A | 312 | −13 | 27 | 57 | 6 |
| 101 | 0.89 | 0.11 | 0.67 | 0.25 | 0.08 | 1.06 | 1.7 | 4.6 | A | 310 | −13 | 26 | 58 | 7 |
| 102 | 0.93 | 0.07 | 0.60 | 0.34 | 0.07 | 1.08 | 1.7 | 4.5 | A | 323 | −14 | 28 | 59 | 5 |
| 103 | 0.87 | 0.13 | 0.60 | 0.33 | 0.07 | 1.10 | 1.8 | 4.6 | A | 309 | −15 | 25 | 56 | 6 |
| 104a | 0.88 | 0.12 | 0.62 | 0.31 | 0.07 | 1.15 | 1.8 | 4.5 | A | 306 | −15 | 26 | 57 | 7 |
| *104b | 0.87 | 0.13 | 0.64 | 0.28 | 0.08 | 1.20 | 1.7 | 4.5 | A | 287 | −17 | *9 | *45 | 6 |

Composition of each component a, b, c, d and e corresponds to a formula $(Ba_aGd_b)_\alpha(Ti_cZr_dMg_e)O_3$ Samples with a * mark mean those out of the range of the present invention.

Example 9

Except for using an oxide of Sm, Eu, Td or Dy as an alternative to $Gd_2O_3$, capacitor samples were produced and evaluated as with Example 3. The amount of each component added and results of evaluation are shown in Table 8.

As shown in Table 8, when using an oxide of Sm, Eu, Td or Dy as an alternative to $Gd_2O_3$, it was confirmed to obtain similar properties.

Example 10

First, $Ba_nZrO_{2+n}$, $MgCO_3$, $Gd_2O_3$, MnO and $SiO_2$ were prepared and mixed by a ball mill. The obtained mixture of powders was preliminarily calcined at 1000° C. to prepare partially calcined powders with an average particle size of 0.2 μm. Then, the obtained partially calcined powders were wet pulverized by a ball mill for 15 hours together with $Ba_m$-$TiO_{2+m}$ powders having an average particle size of 0.6 μm and

TABLE 8

Table 8

| Sample No. | Ba a | R b | Ti c | Zr d | Mg e | R | Mn | Si | Powder | $\epsilon$ s | TC (125° C.) [%] | High Temperature Accelerated Lifetime [hour] | Breakdown Voltage [V/μm] | Electrostriction [ppm] |
|---|---|---|---|---|---|---|---|---|---|---|---|---|---|---|
| 105 | 0.87 | 0.13 | 0.67 | 0.30 | 0.03 | Sm | 1.9 | 4.4 | A | 334 | −15 | 27 | 55 | 7 |
| 106 | 0.89 | 0.11 | 0.60 | 0.32 | 0.08 | Eu | 1.6 | 4.6 | A | 321 | −13 | 28 | 58 | 6 |
| 107 | 0.90 | 0.10 | 0.63 | 0.33 | 0.04 | Gd | 1.7 | 4.5 | A | 287 | −14 | 26 | 56 | 5 |
| 108 | 0.91 | 0.09 | 0.65 | 0.30 | 0.05 | Tb | 1.9 | 4.5 | A | 298 | −15 | 25 | 57 | 6 |
| 109 | 0.88 | 0.12 | 0.61 | 0.31 | 0.08 | Dy | 1.8 | 4.6 | A | 301 | −14 | 28 | 59 | 7 |

Composition of each component a, b, c, d and e corresponds to a formula $(Ba_aR_b)_\alpha(Ti_cZr_dMg_e)O_3$ In the present example, those with α = 1.060 were used.

Samples with a * mark mean those out of the range of the present invention.

dried to obtain dielectric materials. The powder obtained from this production method was defined as powder "E".

Except for using the powder "E" instead of the powder "A", capacitor samples were produced and evaluated as with Example 3. The amount of each component added and results of evaluation are shown in Table 9.

TABLE 9

| Sample No. | $Ba_nZrO_{2+n}$ [mol] | MgO [mol] | $Gd_2O_3$ [mol] | MnO [mol] | $SiO_2$ [mol] | Powder | $\epsilon s$ | TC (125° C.) [%] | High Temperature Accelerated Lifetime [hour] | Breakdown Voltage [V/μm] | Electro-striction [ppm] |
|---|---|---|---|---|---|---|---|---|---|---|---|
| *110 | 20 | 7.7 | 6.8 | 1.5 | 4.2 | E | 359 | −17 | 7 | 37 | 7 |
| 111 | 35 | 7.8 | 7.1 | 1.6 | 4.8 | E | 322 | −15 | 26 | 55 | 5 |
| 112 | 40 | 8.1 | 6.9 | 1.7 | 4.3 | E | 315 | −15 | 27 | 57 | 6 |
| 113 | 45 | 7.7 | 7.2 | 1.5 | 4.1 | E | 306 | −15 | 26 | 58 | 7 |
| 114 | 55 | 7.8 | 7.0 | 1.5 | 4.4 | E | 290 | −14 | 28 | 60 | 6 |
| 115 | 65 | 8.2 | 7.4 | 1.8 | 4.4 | E | 279 | −14 | 28 | 62 | 5 |
| *116 | 70 | 8.4 | 7.0 | 1.9 | 4.5 | E | 212 | −14 | 29 | 59 | 4 |
| *117 | 40 | 2.0 | 7.1 | 1.4 | 5.0 | E | 418 | −22 | 25 | 42 | 10 |
| 118 | 41 | 4.0 | 7.4 | 1.3 | 4.9 | E | 331 | −14 | 26 | 56 | 6 |
| 119 | 39 | 12.0 | 6.7 | 1.9 | 4.8 | E | 289 | −15 | 25 | 62 | 5 |
| *120 | 41 | 15.0 | 6.8 | 1.6 | 4.9 | E | 187 | −13 | 7 | 44 | 4 |
| *121 | 38 | 7.2 | 2.0 | 1.5 | 4.3 | E | 512 | −26 | 8 | 39 | 12 |
| 122 | 43 | 8.1 | 4.0 | 1.4 | 4.5 | E | 398 | −15 | 25 | 57 | 6 |
| 123 | 42 | 8.3 | 12.0 | 1.7 | 4.1 | E | 250 | −12 | 26 | 59 | 5 |
| *124 | 39 | 7.8 | 15.0 | 1.8 | 4.2 | E | 199 | −11 | 26 | 52 | 6 |
| *125 | 42 | 8.4 | 7.1 | 0.2 | 4.6 | E | 342 | −15 | 6 | 52 | 6 |
| 126 | 39 | 7.6 | 6.9 | 0.5 | 4.5 | E | 311 | −13 | 28 | 58 | 6 |
| 127 | 38 | 7.9 | 7.2 | 3.0 | 4.5 | E | 295 | −15 | 30 | 57 | 5 |
| *128 | 41 | 8.1 | 7.2 | 5.0 | 4.0 | E | 194 | −23 | 29 | 51 | 4 |
| *129 | 42 | 7.8 | 7.3 | 1.5 | 1.5 | E | 226 | −14 | 9 | 57 | 4 |
| 130 | 40 | 7.6 | 7.2 | 1.5 | 3.0 | E | 306 | −13 | 25 | 54 | 6 |
| 131 | 43 | 8.1 | 7.1 | 1.8 | 6.0 | E | 348 | −15 | 27 | 53 | 6 |
| *132 | 41 | 7.8 | 6.7 | 1.9 | 9.0 | E | 411 | −27 | 28 | 51 | 7 |

Content of each component is calculated with respect to 100 moles of $Ba_mTiO_{2+m}$.
Samples with a * mark mean those out of the range of the present invention.

From Table 9, by making the compositions of dielectric ceramic composition within the predetermined ranges of the present invention, it can be confirmed to improve breakdown voltage (withstand pressure) and high temperature accelerated lifetime (HALT) while maintaining good specific permittivity ($\epsilon$s), capacitance-temperature characteristic (TC) and amount of electrostriction.

The invention claimed is:

1. A dielectric ceramic composition comprising
$Ba_mTiO_{2+m}$ wherein "m" satisfies $0.99 \leq m \leq 1.01$,
$Ba_nZrO_{2+n}$ wherein "n" satisfies $0.99 \leq n \leq 1.01$,
an oxide of Mg,
an oxide of R wherein R is at least one selected from Sc, Y, La, Ce, Pr, Nd, Pm, Sm, Eu, Gd, Tb, Dy, Ho, Er, Tm, Yb and Lu,
an oxide of at least one element selected from Mn, Cr, Co and Fe, and
an oxide of at least one element selected from Si, Li, Al, Ge and B;
wherein a ratio of each component, calculated as a conversion of an oxide or composite oxide, with respect to 100 moles of said $Ba_mTiO_{2+m}$ is
$Ba_nZrO_{2+n}$: 35 to 65 moles,
an oxide of Mg: 4 to 12 moles,
an oxide of R: 4 to 15 moles,
an oxide of Mn, Cr, Co and Fe: 0.5 to 3 moles, and
an oxide of Si, Li, Al, Ge and B: 3 to 9 moles.

2. The dielectric ceramic composition as set forth in claim 1, wherein a ratio of said $Ba_nZrO_{2+n}$ with respect to 100 moles of said $Ba_mTiO_{2+m}$ is 40 to 55 moles.

3. An electronic device comprising a dielectric layer comprised of the dielectric ceramic composition as set forth in claim 2 and an internal electrode layer.

4. An electronic device comprising a dielectric layer comprised of the dielectric ceramic composition as set forth in claim 1 and an internal electrode layer.

5. A dielectric ceramic composition comprising a first component expressed by a formula $(Ba_aR_b)_\alpha(Ti_cZr_dMg_e)O_3$, wherein
R in the above formula is rare-earth element;
in the above formula,
  $0.8 \leq a \leq 0.96$,
  $0.04 \leq b \leq 0.2$,
  $0.55 \leq c \leq 0.7$,
  $0.24 \leq d \leq 0.39$,
  $0.02 \leq e \leq 0.09$, and
  $1 \leq \alpha \leq 1.15$; and
with respect to 100 moles of $Ba_mTiO_{2+m}$ wherein "m" satisfies $0.99 \leq m \leq 1.01$) included in said first component,
0.5 to 3.0 moles of an oxide of at least one element selected from Mn, Cr, Co and Fe, and 3 to 9 moles of an oxide of at least one element selected from Si, Li, Al, Ge and B are further included.

6. An electronic device comprising a dielectric layer comprised of the dielectric ceramic composition as set forth in claim 5 and an internal electrode layer.

* * * * *